Figure 1:
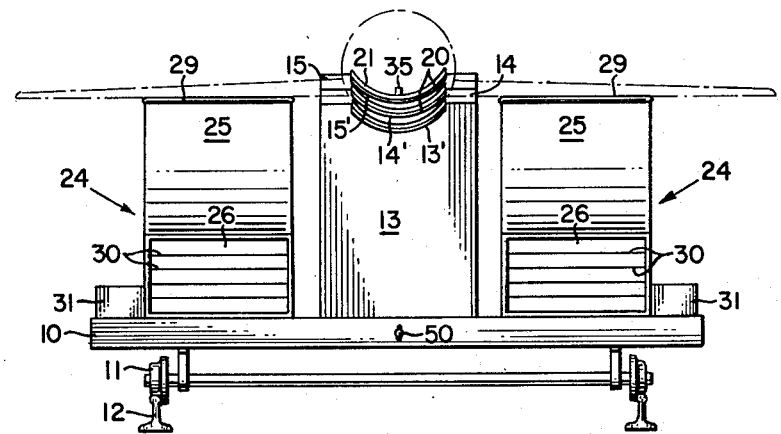

Feb. 26, 1957        E. M. KANE        2,783,005

AIRCRAFT LAUNCHING AND LANDING DEVICE

Filed Sept. 24, 1954        2 Sheets-Sheet 1

INVENTOR
ERNEST M. KANE

BY

ATTORNEYS

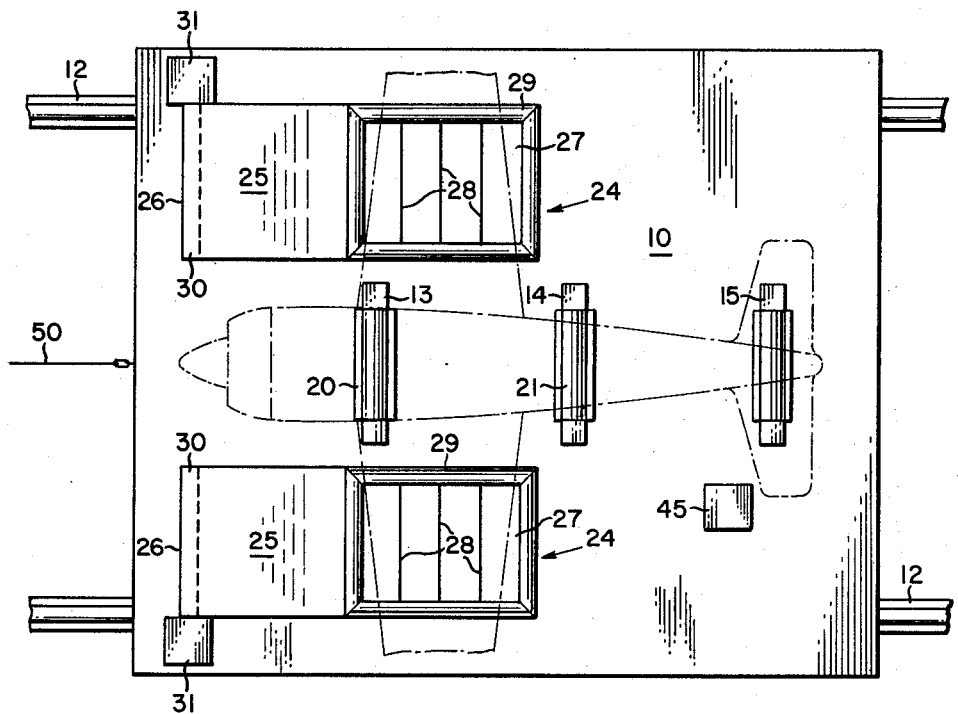
Fig. 3
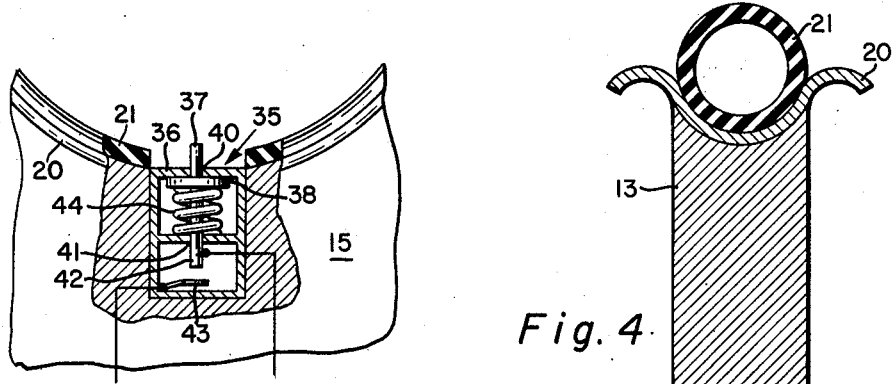
Fig. 5
Fig. 4
INVENTOR
ERNEST M. KANE
BY
ATTORNEYS

United States Patent Office 2,783,005
Patented Feb. 26, 1957

2,783,005

AIRCRAFT LAUNCHING AND LANDING DEVICE

Ernest M. Kane, Oxnard, Calif.

Application September 24, 1954, Serial No. 458,292

9 Claims. (Cl. 244—63)

(Granted under Title 35, U. S. Code (1952), sec. 266)

The invention described herein may be manufactured and used by or for the Government of the United States of America for governmental purposes without the payment of any royalties thereon or therefor.

The present invention relates to a new and novel airplane launching and landing apparatus and more particularly to an aircraft launching and landing apparatus having a means for directing air in an upward direction such that it impinges on a portion of the aircraft adjacent to the apparatus.

It has long been recognized that it would be desirable to eliminate the conventional landing gear of aircraft since such gear adds a great deal of weight, yet serves no other purpose than enabling the launching and landing of the aircraft. Accordingly, various auxiliary devices have been provided for launching and landing aircraft thereby eliminating the necessity of providing landing gear in the aircraft itself. Such prior art devices have employed a movable carriage provided with a suitable cradle means for supporting an aircraft. Such a device is shown for example in U. S. Patent #2,436,240. However, these prior art devices are not satisfactory during landing operations because of the difficulty in properly positioning a landing aircraft relative to the apparatus. Furthermore, the shock load on the structure of the aircraft upon impact with the apparatus is excessive.

The present invention provides a cushioning means associated with the cradle members of the device to substantially reduce the impact shock loads on the structure of landing aircraft. An air-flow control means is also provided which directs air in an upward direction so as to impinge on the lower surface of the wings of an adjacent aircraft. Such air flow assists the plane in rising during the launching operation and serves as a cushion during landing operations. This upward flow of air also serves to automatically level the aircraft about its longitudinal axis and enables the aircraft to be landed at a slower speed than would be possible without such an airflow control means by reducing the effective stalling speed of the aircraft. In this manner, the major disadvantages of prior art devices have been eliminated. The invention apparatus enables an aircraft to be easily positioned relative thereto, and excessive shock loads to the aircraft structure are prevented during landing operations.

An object of the present invention is the provision of a new and novel aircraft launching and landing apparatus which enables aircraft to be landed at lower speeds than are possible with conventional landing gear.

Another object is to provide an aircraft launching and landing apparatus which prevents excessive shock loads to an aircraft structure during landing operations.

A further object of the invention is the provision of an aircraft launching and landing apparatus which automatically levels an airplane about its longitudinal axis during launching or landing.

Still another object is to provide an aircraft launching and landing apparatus which provides additional lift to an airplane during launching.

Yet another object of the invention is the provision of an aircraft launching and landing apparatus which is simple and inexpensive in construction, yet rugged and reliable in operation.

Figure 2:
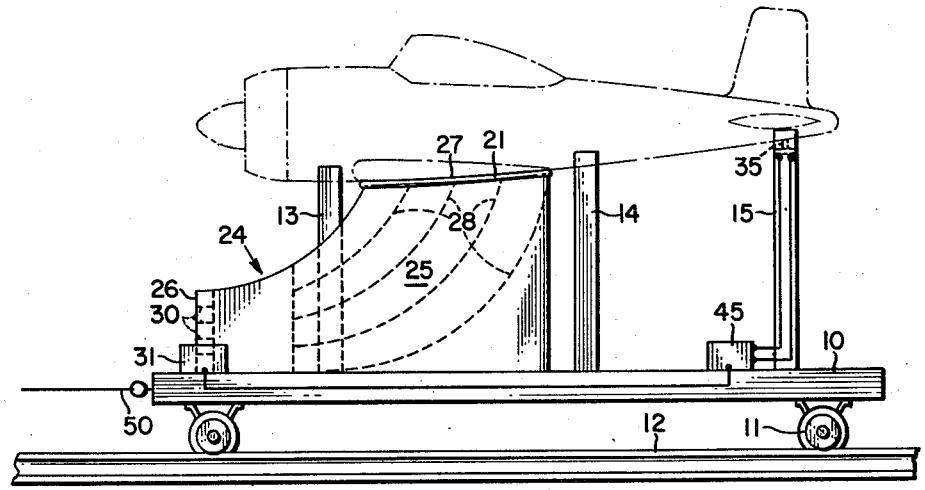

Other objects and many of the attendant advantages of this invention will be readily appreciated as the same becomes better understood by reference to the following detailed description when considered in connection with the accompanying drawings wherein:

Fig. 1 is an elevation view of the invention apparatus,
Fig. 2 is a side view of the apparatus shown in Fig. 1,
Fig. 3 is a top view of the apparatus shown in Fig. 1,
Fig. 4 is an enlarged view in cross section of a portion of the apparatus, and
Fig. 5 is a cutaway view showing the details of construction of the switch means of the apparatus.

Referring now to the drawings wherein like reference characters designate like or corresponding parts throughout the several views, there is shown in Figs. 1 to 3 the invention apparatus with an aircraft shown in phantom lines supported thereon. A mobile body member 10 is provided with four flanged wheels 11 which are adapted to run on tracks 12 suitably mounted on the ground. The body member is preferably mounted on tracks to insure that it will follow a steady course during movement thereof.

Three longitudinally spaced cradle members 13, 14, and 15 are mounted on the body member, each cradle member being provided with an arcuate portion 13', 14', and 15' respectively for receiving a correspondingly curved outer surface of an aircraft fuselage. Any suitable number of cradle members may be employed, and the arcuate portions thereof may be shaped to conform to the outer surface of any particular aircraft with which the apparatus is to be employed.

The upper surface of the arcuate portions of each of the cradle members supports a cushion means as shown in Fig. 4. These upper surfaces are each provided with a lipped flange 20 which is adapted to support a cushion member 21. Member 21 is in the form of a hollow tube which is inflated with a suitable gas such as air under low pressure whereby the tube is adapted to be deformed and cushion the impact of an aircraft fuselage upon landing thereon. The tube may be suitably bonded to member 20 to insure that it will not be displaced when engaged by the aircraft. The tube may be divided into sections or nodes by means of separators in order to prevent complete flattening of any portion thereof.

Two laterally spaced air-flow control means 24 are mounted at the front of the body member, each of the air-flow control means comprising a hollow body member 25 which is provided with a first opening 26 which faces forwardly of body member 10 and a second opening 27 which faces upwardly relative to the body member. Suitable baffle members 28 are provided within each of the air-flow control means whereby as member 10 moves forwardly, air will enter opening 26 and be deflected by the baffles upwardly and out of openings 27.

The upper surfaces of each of members 25 are provided with a channel surrounding openings 27. Cushion members 29 similar to members 21 are provided in each of the channels and the contour of the upper surfaces of members 25 is such that it is complementary to the contour of the lower surfaces of the wings of the aircraft with which it is utilized. Members 25 are thereby adapted to engage the wings of the aircraft and assist cradle members 13, 14 and 15 in supporting the aircraft. Although members 25 have been shown as extending laterally under only a portion of the wings, it should be understood that members 25 may be extended to support the wings substantially throughout their entire lateral dimensions.

A plurality of louver members 30 are provided across openings 26, each of the louver members being pivotally mounted for rotation about its longitudinal axis. The louver members of each air-flow control means are connected to move in tandem and are geared to a motor 31 whereby the louvers may be actuated to open position as indicated in Figs. 1 and 2 or they may be rotated so as to completely close openings 26.

Referring now to Fig. 5, a switch means is shown which controls the actuation of motor 31 and louvers 30. The switch means indicated generally by numeral 35 is mounted in the rearmost cradle member such that it is adapted to be engaged by the rear portion of an aircraft fuselage when the aircraft is properly positioned on the cradle members. Switch 35 is mounted in a supporting frame 36 and includes an elongated pin 37 having a circumferential shoulder 38 formed integrally at an intermediate portion thereof. Pin 37 is longitudinally slidable through openings 40 and 41 formed in frame 36, and the lower portion 42 of the pin is adapted to engage a spring contact 43 thereby closing a circuit to a source of power 45 which is in turn connected to motor 31 such that the louvers are actuated in the proper direction. A spring 44 is disposed about pin 37 and engages the lower surface of shoulder 38 whereby pin 37 is normally urged in an upward direction, opening the switch. The circuit is arranged such that the louvers will be closed when an aircraft is positioned within the cradle means and switch 35 is actuated to its down or closed position, and the louvers will be open when the switch is actuated to its up position by spring 44.

Switch 35 provides a means whereby the flow of air through members 25 may be controlled. When an aircraft is positioned on the apparatus prior to launching, switch 35 will be closed and louvers 30 will also be closed. The mobile member 10 is then suitably accelerated by towing it with a cable 50 or providing other suitable driving means such as a conventional motor connected to the wheels thereof. When the aircraft has been accelerated sufficiently such that it is ready to become airborne, the pilot raises the tail portion of the aircraft as is done in conventional aircraft provided with landing gear, and switch 35 will thereby be opened. Upon opening of the switch, louvers 30 are also opened and a blast of air is directed upwardly through members 25 and opening 27 against the lower surface of the wings of the aircraft. This flow of air against the lower surfaces of the wings will assist in lifting the aircraft away from the apparatus.

When an aircraft is landing on the apparatus, member 10 is accelerated such that its speed is substantially the same as the aircraft, whereupon the pilot maneuvers the aircraft into landing position and lowers the fuselage into the cradle members. During landing, the air directed upwardly by members 25 against the lower surfaces of the wings serves as an air cushion. When the aircraft is positioned within the cradle members and the tail portion thereof is lowered, switch 35 will be closed thereby closing louvers 30 and preventing air from being directed up against the lower surfaces of the wings which would be undesirable once the aircraft is positioned within the cradle member.

It should be noted that both during launching and landing operations the air directed upwardly by members 25 serves to level the aircraft about its longitudinal axis since if one wing drops lower than the other, the force thereon produced by the air directed upwardly by the corresponding air-flow control means will be increased and thereby tends to raise the wing back to a position where it is level with the other wing.

An additional advantage of having an air flow impinge upon the lower surfaces of the wings of the aircraft during landing lies in the fact that the effective stalling speed of the aircraft is reduced and the aircraft may accordingly be landed at a slower speed than is possible with conventional landing gear. Such lower landing speeds contribute to the safety of the landing and facilitate the proper positioning of the aircraft relative to the invention apparatus.

A suitable detent means may be provided for securing the fuselage of the aircraft to one or more of the cradle members when the aircraft is in proper supported position on the apparatus. Such detent means must of course be selectively releasable in order that the aircraft may be launched or removed from the apparatus when desired.

It is apparent from the foregoing that there is provided a new and novel aircraft launching and landing apparatus which enables aircraft to be landed at lower speeds than are possible with conventional landing gear and which prevents excessive shock loads to the associated aircraft structure. The invention apparatus automatically levels the aircraft about its longitudinal axis and provides additional lift to the aircraft during launching.

Obviously many modifications and variations of the present invention are possible in the light of the above teachings. It is therefore to be understood that within the scope of the appended claims the invention may be practiced otherwise than as specifically described.

I claim:

1. An aircraft launching and landing apparatus which comprises rectilinearly mobile body means having cradle means thereon and movable therewith for supporting an aircraft, and air flow control means on said body means and movable therewith for directing air in an upward direction relative to said body means such that the air impinges on a portion of an aircraft adjacent to said apparatus, and means connected to said body means for moving said mobile body means and the components thereon in the direction of and at a speed substantially equal to that of an aircraft in landing or take off attitude.

2. Apparatus as defined in claim 1 wherein said air flow control means includes means for supporting said aircraft.

3. An aircraft launching and landing apparatus which comprises mobile body means having a plurality of cradle members thereon, each of said cradle members having cushion means thereon for supporting an aircraft, air-flow control means on said body means and having cushion means for supporting said aircraft, said air-flow control means including a passage therein for directing air in an upward direction relative to said body means such that the air impinges on a portion of an aircraft adjacent to said apparatus.

4. Apparatus as defined in claim 3 wherein said air-flow control means also includes selectively operable louver means for controlling the amount of air flow therethrough, and baffle means disposed in said passage.

5. An aircraft launching and landing apparatus which comprises mobile body means having a plurality of longitudinally spaced cradle members thereon, each of said cradle members having a portion for supporting an aircraft, air flow control means on said body means and having a portion for supporting said aircraft, said air-flow control means having a passage formed therein, the opposite ends of said passage opening forwardly and upwardly respectively with respect to said body means, selectively operable louver means disposed at said forwardly opening end of said passage, and baffle means disposed in said passage.

6. Apparatus as defined in claim 5 including a motor connected to said louver means, and an electric circuit having a switch means adapted to be engaged by a portion of an aircraft for automatically operating said motor and said louver means.

7. Apparatus as defined in claim 6 wherein said switch means is supported by one of said cradle members.

8. An aircraft launching and landing apparatus which comprises mobile body means having a plurality of longitudinally spaced cradle members thereon, means for guiding the movement of said body means, each of said cradle members having cushion means thereon for supporting the fuselage of an aircraft, air-flow control means on said body means and having cushion means for supporting the wings of said aircraft, said air-flow control means having a passage formed therein, selectively operable louver means disposed adjacent one end of said passage for controlling the amount of air flow therethrough, baffle means disposed in said passage, a motor connected to said louver means, and an electric circuit having a switch means supported by the rearmost of said cradle members for automatically operating said motor and said louver means.

9. An aircraft launching and landing apparatus which comprises movable body means having a longitudinal axis, a plurality of longitudinally spaced cradle means mounted on said body means, each of said cradle means being disposed symmetrically about said axis and having cushion means thereon for supporting the fuselage of an aircraft, a plurality of airflow control means mounted on said body means and disposed laterally of said cradle means, at least one of said airflow control means being positioned on each side of said longitudinal axis, each of said airflow control means having cushion means thereon for supporting the wings of an aircraft, each of said airflow control means including a passage therein for directing air in an upward direction relative to said body means such that the air impinges on the under portion of the wings of an aircraft adjacent to said apparatus.

References Cited in the file of this patent

UNITED STATES PATENTS

| | | |
|---|---|---|
| Re. 15,758 | Gibbons | Feb. 12, 1924 |
| 1,749,959 | Read | Mar. 11, 1930 |
| 2,436,240 | Wiertz | Feb. 17, 1948 |

FOREIGN PATENTS

| | | |
|---|---|---|
| 343,763 | Great Britain | Feb. 26, 1931 |
| 882,390 | France | Mar. 1, 1943 |